April 7, 1953
J. W. DICKEY
2,633,736
METHOD AND APPARATUS FOR DETERMINING
THE FREEZING POINT OF LIQUIDS
Filed March 28, 1949
2 SHEETS—SHEET 1
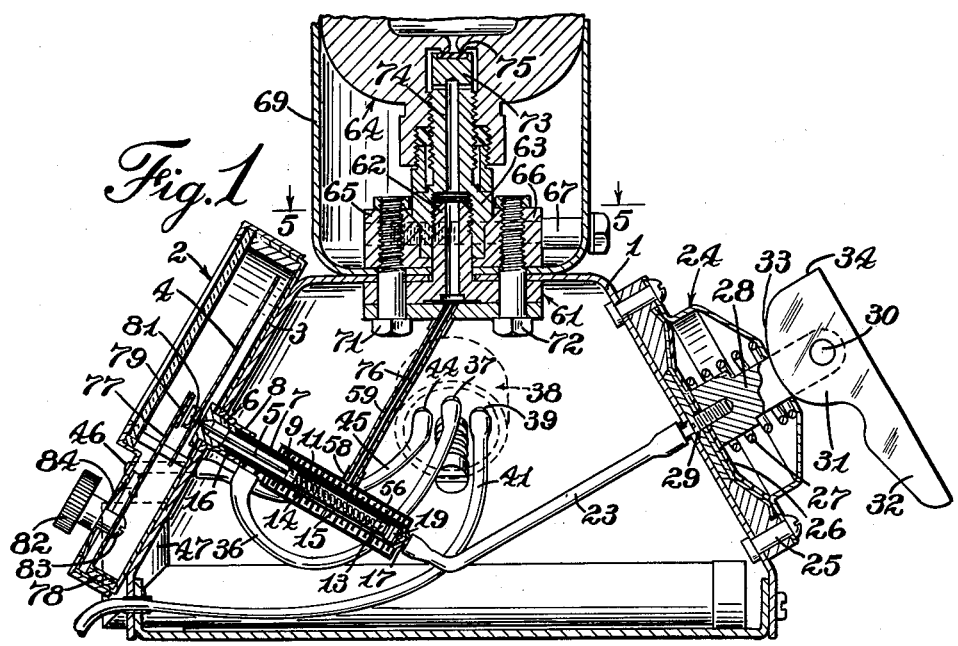
Fig.1
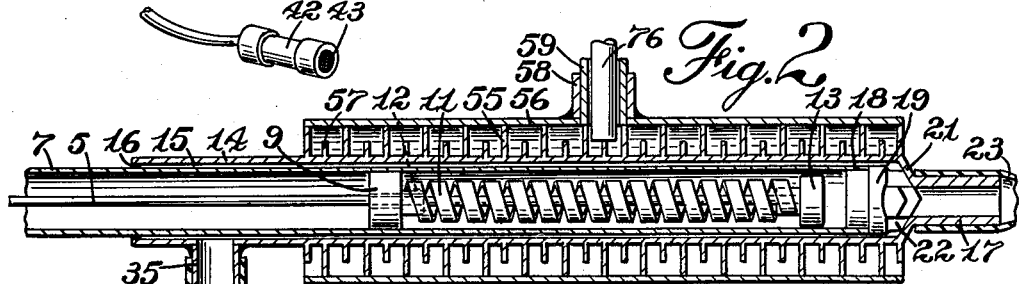
Fig.2
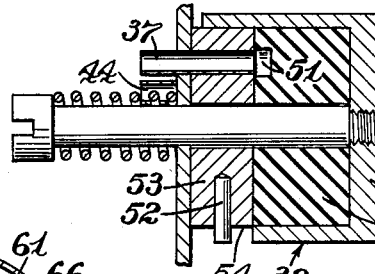
Fig.3
Fig.4
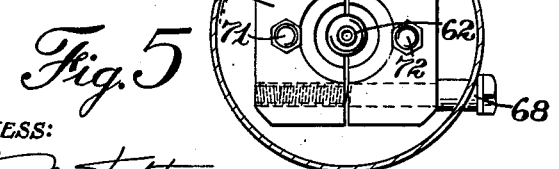
Fig.5
WITNESS:
Esther M. Stockton
INVENTOR:
John W. Dickey
BY
Clinton S. James
ATTORNEY April 7, 1953  J. W. DICKEY  2,633,736
METHOD AND APPARATUS FOR DETERMINING
THE FREEZING POINT OF LIQUIDS
Filed March 28, 1949  2 SHEETS—SHEET 2
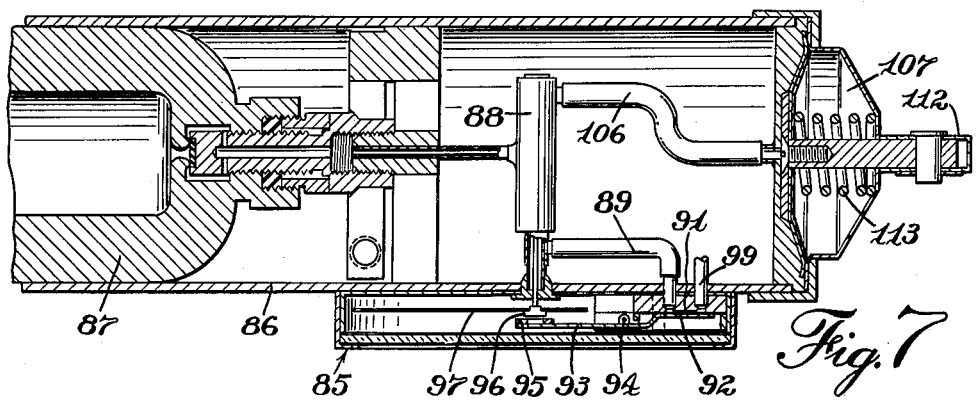
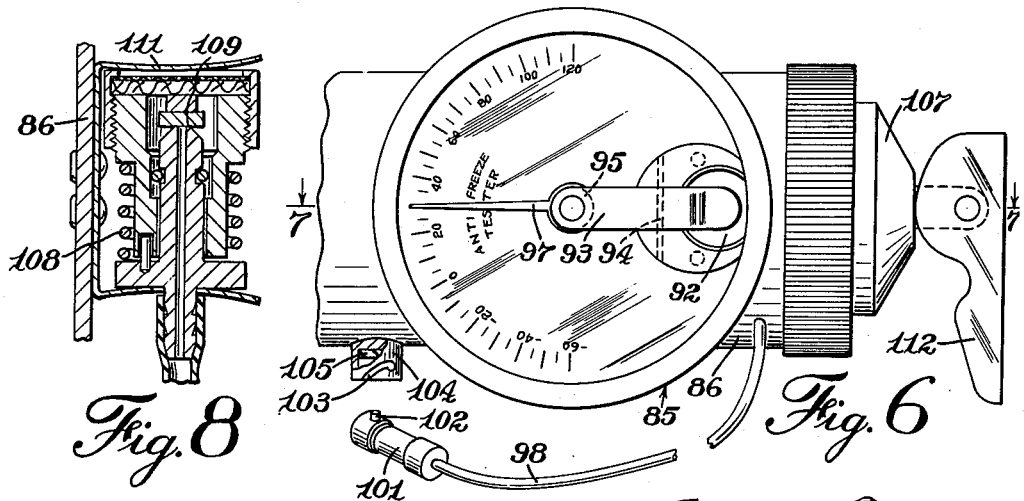
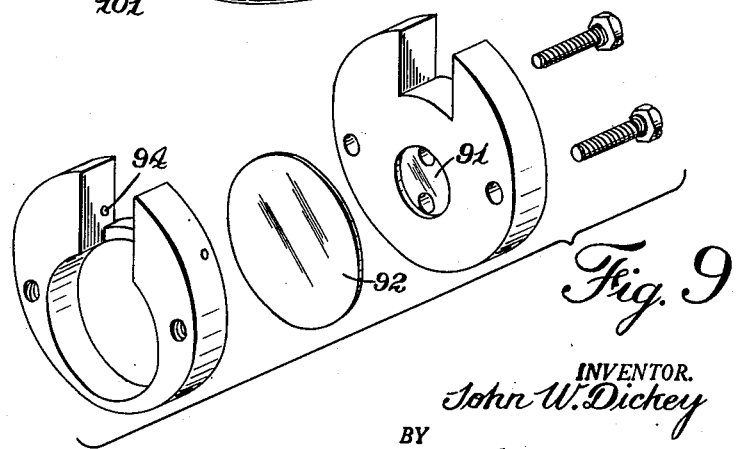
WITNESS:
INVENTOR.
John W. Dickey
BY
ATTORNEY Patented Apr. 7, 1953

2,633,736

UNITED STATES PATENT OFFICE 2,633,736

METHOD AND APPARATUS FOR DETERMINING THE FREEZING POINT OF LIQUIDS

John W. Dickey, Newfield, N. Y., assignor to Bendix Aviation Corporation, a corporation of Delaware Application March 28, 1949, Serial No. 83,986

6 Claims. (Cl. 73—17)

The present invention relates to a method and apparatus for determining the freezing point of liquids and more particularly mixtures of liquids or solutions used in the cooling systems of internal combustion engines.

It is an object of the present invention to provide a novel method of the above type which is simple in operation, accurate in result, and uniform in determination of the freezing point irrespective of the character of the liquid being tested.

It is another object to provide such a method which, in contra-distinction to methods dependent on the specific gravity of the liquid, is completely independent of the temperature of the liquid to be tested and provides a direct indication without the necessity of any correcting factors.

It is another object to provide such a method in which the end point is unmistakable, and the indication thereof may be recorded either manually or automatically.

It is a further object of the present invention to provide a novel apparatus for determining the freezing points of liquids which is accurate and reliable, and simple in construction and operation.

It is another object to provide such a device which is easily portable, requires no power connection, and is immediately available for use without the necessity of preparation or adjustment.

It is another object to provide such a device which furnishes an accurate indication of the freezing point of the sample irrespective of variations in ambient temperature, the temperature of the sample, or in the skill or adeptness of the operator.

Further objects and advantages will be apparent from the following description taken in connection with the accompanying drawings which illustrate means for carrying out the method, and in which:

Fig. 1 is a vertical, substantially mid-sectional view of a preferred embodiment of the invention;

Fig. 2 is an enlarged detail of the thermometric element and the surrounding freezing chamber;

Fig. 3 is a detail of the two-way valve for controlling the admission and discharge of the sample to be frozen;

Fig. 4 is a section taken on the line 4—4 of Fig. 3.

Fig. 5 is a section taken substantially on the line 5—5 of Fig. 1.

Fig. 6 is a side elevation, partly broken away, of a second embodiment of the invention;

Fig. 7 is a section taken substantially on the line 7—7 in Fig. 6;

Fig. 8 is a sectional detail of a modified form of discharge nozzle with the mounting means therefor;

Fig. 9 is an enlarged detail in perspective of the means for automatically actuating the arresting mechanism for the thermometer needle.

Applicant's novel method of determining the freezing point of a liquid comprises briefly, the freezing of a small sample of the liquid in a thin walled chamber in close thermal connection with a thermometric element, applying hydraulic pressure to the sample to eject it from the chamber, warming the chamber and thermometric element till the sample thaws, and obtaining the reading of the thermometer at the instant that the sample starts to emerge from the chamber. The freezing of the sample may of course be accomplished by any suitable means, but it has been found possible to construct very convenient instruments by utilizing for this purpose small tubes of compressed and liquified carbon dioxide which are commercially available for operating jacks, inflating tires etc.

It is actually the melting point of the liquid which is determined, but this is, of course, for all practical purposes, the same as the freezing point.

In Fig. 1 of the drawing there is illustrated a pedestal frame 1 on one inclined side of which there is mounted in a suitable manner a thermometer 2 having a stationary dial 3 and a needle 4 which is fixedly mounted on a shaft 5 journalled in a bearing member 6. A tube 7 of thermally conductive material such as brass is fixedly mounted on the interior of frame 1 as by means of a fitting 8, and loosely surrounds the shaft 5. As best shown in Fig. 2, the tube 7 is provided with a bearing member 9 fixed therein in any suitable manner and rotatably supporting the rod 5 which extends therethrough. A coiled strip 11 of thermostatic bi-metal is rigidly attached to the bearing 9 at one end as indicated at 12, and at its other end is fixed to the end of the shaft 5 as by means of anchor collar 13.

An outer tube 14 is mounted co-axially on the tube 7, the inner diameter of the tube 14 being somewhat larger than the outer diameter of the tube 7 whereby an annular space or chamber 15 is provided between the tubes. This space is closed at one end by a sealing and anchoring means such as a brazed collar 16 and at the other end the space 15 communicates with the interior of a nipple 17 formed as a reduced extension of the tube 14. The adjacent end of the tube 7 is fixedly mounted as shown at 18 on a bearing stud 19 which conforms to the reduced portion 21 of the outer tube 14, and is provided with openings 22 connecting the space 15 between the tubes with the interior of the nipple 17.

Nipple 17 is connected by a conduit 23 to a diaphragm chamber indicated generally by numeral 24 mounted as shown at 25 on the side of the frame 1. Chamber 24 has a flexible diaphragm 26 suitably mounted therein, and a spring 27 urges the diaphragm to the left in Fig. 1 toward the position there illustrated. Means for flexing the diaphragm to the right in Fig. 1 so as to dilate the diaphragm is provided in the form of a link member 28 fixed as indicated at 29 to the diaphragm and pivotally connected at 30 to a manually operable cam member 31, the shape of the cam being such that when the handle 32 thereof is raised, the curved portion 33 will engage the top of the diaphragm chamber 24 so as to draw the link 28 to the right until the flat portion 34 of the cam member engages the top of said chamber so as to immobilize the cam member.

The other end of the annular space 15 between the tubes 14 and 7 is connected by a nipple 35 to a conduit 36 which is attached to the common connector 37 of a three-way valve 38 (Fig. 3). A second connector 39 of valve 38 receives one end of a conduit 41 which terminates at its other end in an inlet fitting 42 which is preferably provided with a strainer 43. A third connector 44 of the valve 38 receives one end of a conduit 45, the opposite end of which is connected to an outlet fitting 46 which is preferably located over a removable cup 47 for receiving the discharged liquid.

As best shown in Fig. 4, the valve 38 comprises a cap-shaped rotor 48 having a suitable packing material such as rubber seated therein as indicated at 49, said packing member being provided with an arcuate groove 51 which is adapted to be brought into registry with the connectors 37, 39 and 44 of the valve so as to selectively provide communication between the connector 37 and either the inlet connector 39 or the outlet connector 44 as the rotor is suitably adjusted. The pivotal movement of the rotor is preferably limited by suitable means such as a pin 52 mounted in the stationary body 53 of the valve and projecting into an arcuate slot 54 in the rotor.

The outer tube 14 is provided with a series of circular fins 55 located in spaced relation around the major portion of its length, and a casing member 56 is arranged to surround and enclose the fins, and is preferably fixedly mounted thereon in any suitable manner as by solder. Alternate fins are flattened off on opposite sides as indicated at 57 so as to provide a tortuous path from one end to the other of the casing 56. A nipple 58 is fixed to the exterior of the casing 56 at an intermediate point and is arranged to receive tube 59 which extends to a fitting indicated generally by numeral 61 mounted on the top of the frame 1. This fitting comprises a threaded nipple 62 which is adapted to enter the outlet nozzle 63 of a standard commercial form of container 64 for liquid carbon dioxide. The fitting 61 also comprises a pair of clamp members 65, 66 (Fig. 5) which are formed to receive the nozzle 63 and anchor it firmly to the frame 1 by means of the clamping bolts 67, 68. In order to provide a firm support for the carbon dioxide container 64, a cup-shaped receptacle 69 is clamped to the frame 1 by bolts 71 and 72 which also traverse the clamp members 65, 66. The receptacle 69 is formed to slidably receive the lower end of the container 64.

The carbon dioxide container 64 is provided with the usual valve mechanism indicated generally by numeral 73, whereby when the container 64 is grasped and rotated in a counterclockwise direction, since the nozzle 63 is held stationary by the clamp blocks 65, 66 the threaded valve 74 will be withdrawn from the seat 75 so as to permit escape of carbon dioxide from the interior of the container through tube 59 into the interior of the casing 56. It thereupon traverses the tortuous path provided by the fins 55 and escapes from the ends of the casing 56 after having cooled the casing by the extraction of heat therefrom due to the expansion of the carbon dioxide gas. In order to restrict the escape of the gas through the tube 59, a rod 76 is preferably located therein so as to provide a restricted annular passage for the gas.

Means are preferably provided for immobilizing the needle 4 of the thermometer 2 in order to preserve the critical reading thereof. As shown in Fig. 1, this is accomplished by means of a flexible blade 77 anchored as shown at 78 to the interior of the thermometer casing and having on its free end a pad 79 of suitable frictional material arranged to engage a button 81 mounted on the end of the thermometer shaft 5. Manual means for operating blade 77 is provided in the form of a button 82 fixed to the blade at 83 and mounted on the thermometer case by means of a snap diaphragm 84 fixed in any suitable manner to said casing. When the button 82 is drawn outwardly, the diaphragm 84 holds the blade 77 in retracted position as illustrated. When the button 82 is pushed in, the diaphragm 84 snaps over its dead center position and presses the pad 79 against the button 81 on the thermometer shaft so as to prevent rotation of the thermometer needle.

In carrying out the process by means of the structure described above, the inlet fitting 43 is dropped into the liquid to be tested, the valve 38 is adjusted to connect the inlet conduit 41 with the conduit 36 leading to the thermometer casing 56, and the cam 31 is raised so as to dilate the diaphragm 26 and cause a sample of the liquid to be drawn through the conduits and the annular space 15 and into the diaphragm chamber. The carbon dioxide container 64 is then rotated counter-clockwise slightly so as to permit a small amount of the liquified carbon dioxide to escape through the freezing chamber formed by the casing 56. The sample of liquid within the annular space 15 is thus immediately frozen. The container 64 is then closed by clockwise rotation and the cam lever 32 is released so as to permit the spring 27 to apply pressure to the diaphragm 26 tending to eject the trapped fluid from the diaphragm chamber. Since the annular space 15 is at this time filled with frozen fluid, however, its escape is prevented.

The valve 38 is thereupon rotated to connect the conduit 36 with the outlet conduit 45 and the outlet fitting 46 is watched to note when the liquid begins to escape therefrom. As the thermometer fitting warms up gradually from the ambient temperature, the frozen sample within the space 15 starts to thaw, and the pressure of the spring 27 on the diaphragm forces the liquid out of the outlet fitting 46. As soon as the first drop appears at the outlet fitting, the operator presses the locking button 82 thus immobilizing the thermometer needle so as to preserve the reading which thus indicates precisely the temperature at which the sample started to thaw.

It has been found in the use of freeze-point testers as above set forth, that the influx of comparatively warm liquid from the diaphragm chamber into the freezing space 15 when the sample thaws, causes the thermometer needle to shoot up rapidly. This provides a very satisfactory end-point, so that some operators prefer to merely observe the thermometer needle as it slowly rises after the sample is frozen, and note the reading just before the needle jumps upward. This, of course, renders the immobilization of the thermometer needle unnecessary.

In Figs. 6 to 9 inclusive there is illustrated an embodiment of the invention in which the immobilization of the thermometer needle is brought about automatically.

As shown in Figs. 6 and 7, a thermometer 85 is mounted on the side of a tubular casing 86 which receives the end of the carbon dioxide container 87. The freezing chamber indicated generally by the numeral 88 is of the same character as that described in the first embodiment, and the freezing operation therein is carried out in the same manner. In this case, however, one end of the freezing chamber is connected by the conduit 89 to a pressure chamber 91 (Fig. 9) which is closed by an elastic diaphragm 92 which is capable of being flexed outwardly when pressure is generated in said chamber. A lever 93 is pivoted at 94 in the thermometer case and is provided at one end with a pad 95 for engaging and immobilizing the rotary mount 96 of the thermometer needle 97. The opposite end of lever 93 rests on the flexible diaphragm 92 whereby when said diaphragm is flexed outwardly it swings the lever 93 to arrest the movement of the thermometer needle. The inlet conduit 98 is connected at one end as indicated at 99 to the pressure chamber 91 and at its other end has an inlet device 101 provided with studs 102 adapted to engage in the bayonet slots 103 of a socket member 104 fixed to the case 86. Socket member 104 has a pad of sealing material 105 such as rubber seated in the bottom thereof so that when the fitting 101 is mounted in the socket, the opening of the fitting is effectively closed.

Freezing chamber 88 is connected by a conduit 106 to the chamber 107 which is formed and operated in the same manner as the chamber 24 described in the first embodiment.

Fig. 8 illustrates an optional method of securing closure of the inlet fitting when it is mounted on the casing 86. As there shown this is accomplished by means of an automatic valve arrangement which is normally held open by a compression spring 108 but which is closed as shown at 109 when the fitting is pressed and inserted in the holding clip 111 mounted on the casing 86.

In the operation of this embodiment of the invention the inlet fitting 101 is placed in the liquid to be tested and the handle 112 of the cam member is raised in order to compress the bellows spring 113 and draw a sample of the liquid through the conduit 98, pressure chamber 91, conduit 89, freezing chamber 88, conduit 106, and into the diaphragm chamber 107. The inlet fitting 101 is then mounted in the socket member 104, or in the clip 111 as the case may be, so as to close the inlet fitting. The carbon dioxide container 87 is then manipulated as above described to freeze the contents of the chamber 88, after which the cam lever 112 is released so as to allow the spring 113 to place pressure on the frozen sample. The sample is then simply permitted to thaw, and as soon as thawing starts the pressure of the sample is transmitted through the conduit 89 to the pressure chamber 91, and since the conduit 98 is closed at the inlet 101, this pressure builds up and flexes the diaphragm 92 so as to immobilize the thermometer needle and thus record the reading of the thermometer at the instant that thawing of the sample started.

Although certain steps of the novel process have been described in order, and certain physical embodiments of the apparatus used in carrying out the process have been set forth in detail, it will be appreciated that the order of the steps may in some cases be altered to some extent and the precise structure may be varied without departing from the spirit of the invention.

I claim:

1. In a process for determining the thawing point of a liquid the steps of introducing a sample of the liquid into a small chamber which is in thermally conductive relation to the temperature sensitive element of a thermometer, cooling the chamber so as to freeze the sample therein, then terminating the cooling operation, next placing a steady light pressure on the sample in the chamber tending to eject the sample therefrom, then allowing the chamber to warm up by absorption of heat from its surroundings so as to thaw the material therein, and taking the reading of the thermometer at the instant the sample starts to flow from the chamber under said pressure.

2. In a process as set forth in claim 1, the further step of immobilizing the thermometer indicator at the time the sample starts to flow from the chamber under said pressure so as to retain its coincident temperature indication.

3. A freezing point tester for liquids comprising a thermometer having a movable indicating member and a temperature-sensitive element for moving the indicating member, a freezing chamber surrounding the temperature-sensitive element but sealed therefrom and having inlet and outlet openings, a second chamber connected to one of said openings, means for drawing a sample of the liquid to be tested through said freezing chamber and into the second chamber, means for cooling the freezing chamber below the freezing point of said liquid so as to congeal the liquid therein, and means for applying a steady pressure to the liquid in the second chamber, tending to eject the sample therefrom through the freezing chamber.

4. A freezing point tester as set forth in claim 3 including further a conduit receiving the liquid flowing from said freezing chamber when the sample thaws, means preventing the free flow of the sample from said conduit, and means responsive to hydro-static pressure in said conduit for immobilizing the movable member of the thermometer.

5. A freeze point tester for liquids comprising a thermometer having a temperature sensitive element, a hollow freezing chamber surrounding said element but sealed therefrom having inlet and outlet openings, means for drawing a sample of the liquid to be tested into said chamber comprising a receiver connected to said chamber, a flexible diaphragm closing the receiver, manually operable means for dilating the diaphragm and holding it dilated and elastic means for continuously applying pressure to the diaphragm when the dilating means is released; and manually controlled means for conducting a freezing medium around said chamber.

6. A freeze point tester as set forth in claim 5 including further an outlet for liquid ejected from the freezing chamber, said outlet including a pressure chamber, means for obstructing said outlet, and means responsive to pressure in said pressure chamber for immobilizing the registering mechanism of the thermometer.

JOHN W. DICKEY.

REFERENCES CITED

The following references are of record in the file of this patent:

UNITED STATES PATENTS

| Number | Name | Date |
| --- | --- | --- |
| 1,443,537 | Hortvet | Jan. 30, 1923 |
| 1,947,821 | Alleman et al. | Feb. 20, 1934 |
| 2,123,577 | Pelich | July 12, 1938 |
| 2,254,174 | Edwards | Aug. 26, 1941 |
| 2,297,641 | Webber | Sept. 29, 1942 |
| 2,426,965 | Coffey | Sept. 2, 1947 |